INVENTOR
HARRY E. LITTELL JR.

Chisholm and Spencer
ATTORNEYS

INVENTOR
HARRY E. LITTELL JR.

ATTORNEYS

United States Patent Office 3,671,370
Patented June 20, 1972

3,671,370
INTEGRAL TRANSPARENT SAFETY GLASS ARMOR UNIT
Harry E. Littell, Jr., Allison Park, Pa., assignor to PPG Industries, Inc., Pittsburgh, Pa.
Filed June 15, 1970, Ser. No. 46,336
Int. Cl. F41h *5/26;* B32b *1/06*
U.S. Cl. 161—43          7 Claims

ABSTRACT OF THE DISCLOSURE

A transparent safety glass assembly comprising a laminated glass-plastic assembly comprising a plurality of alternate plies of glass and thermoplastic transparent interlayers of plasticized polyvinyl butyral arranged to provide an impact striking section, a transparent polyurethane plasticized in situ to provide a transition section and a transparent polycarbonate providing an impact absorption section is disclosed. The impact transition section also spaces the glass-plastic assembly from a casing in which the assembly is mounted.

BACKGROUND OF THE INVENTION

Figure 1:
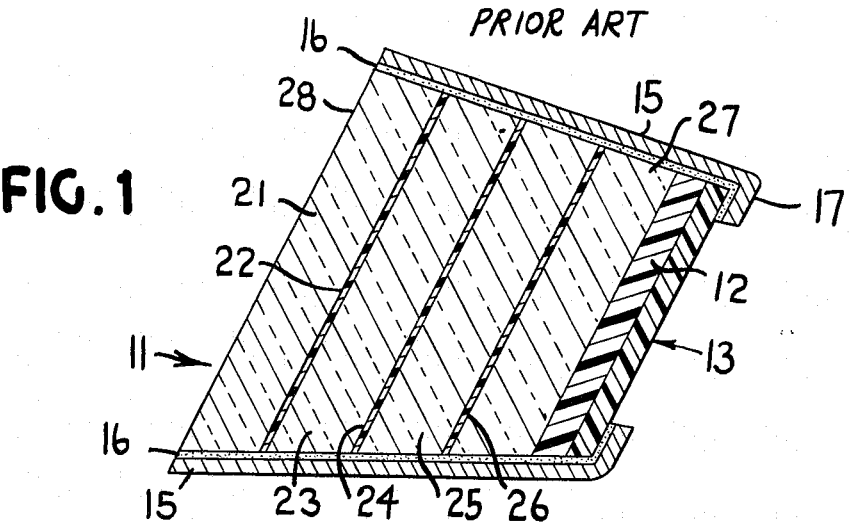

This invention relates to transparent armor plate frequently referred to as multiplate safety glass and particularly refers to an Integral Transparent Safety Glass Armor Unit. The names "multiplate safety glass" or "vision block" or "transparent armor" are commonly given to laminated glass-plastic windows comprising alternate plies of glass and transparent thermoplastic interlayers suitable to resist the penetration of bullets or other projectiles through their thickness.

Bullet resisting glass structures are designed to afford protection against bullets of a particular class and/or range of velocities. Generally speaking, when protection is desired against non-military devices, bullet resisting glass structures need only protect against light or medium calibre ball-type projectiles. Bullet resisting glass structures intended to afford protection for military combatants must also protect against higher calibre, higher velocity, ball and armor piercing projectiles. In addition, it is desired to have minimal areal density (weight per unit area of laminated window) consistent with adequate bullet-resisting performance for military vehicles. Vision blocks for tanks should be as light as possible for a given bullet-resisting capability to permit the tanks to operate with maximum velocity and maneuverability for a given size engine. Transparent safety glass armor windows for aircraft likewise are desired to be as light as possible to permit planes to carry as much equipment and/or armament as is possible to still provide relative safety for the occupants of the aircraft.

Transparent safety glass armor is strengthened by increasing the number of plies of glass alternated with thermoplastic interlayers to improve the resistance of the safety glass laminate to impinging projectiles. However, such strengthening requires added mass, which reduces the payload and/or speed of the vehicle in which the safety glass is installed.

Transparent safety glass armor usually comprises an impact striking section, comprising alternate thick plies of glass and thin plies of interlayer material, that faces outward from the structure or vehicle in which it is mounted, a transition section of thick plastic material and an inner ply of glass or polycarbonate that serves as an impact absorption section. In vision blocks, the area of the multiplate safety glass is a maximum at its outer glass ply and gradually decreases to a minimum at the innermost ply of the multiplate. The vision block is supported in a metal case that covers the sides of the multiplate and has a flange fitting over the inner surface of the impact absorption section.

Conventional, transparent, bullet-resisting glass laminates used as the impact striking section are fabricated by assembling alternate plies of glass and plastic sheeting together and exposing the assembly to an elevated temperature and pressure to bond the plies. Each glass ply of conventional bullet-resisting glass laminates may be of equal glass thickness or of a symmetrical arrangement of thicknesses and each plastic interlayer ply is of equal plastic thickness, with the exception that, in certain structures, the innermost glass plies of certain laminates are thinner than the other plies. Some variations of conventional structure prior to the present invention involved increasing or decreasing thickness of at least one of the glass plies and/or one of the plastic plies. Another variation involved substituting a rigid, thin sheet of light weight polycarbonate material for the innermost glass ply forming the impact absorption section.

The transparent plasticized interlayer material of the impact striking section is preferably composed of a polyvinyl acetal such as plasticized polyvinyl butyral resin. This material is prepared as recited in U.S. Pat. No. 2,400,957 to Stamatoff, and is commonly used as the interlayer of laminated glass windshields because of its adhesion to glass when subjected to suitable temperatures and pressure, because it is transparent when bonded between two sheets of glass and because of its resistance to elongation whenever an object impacts upon a laminated safety glass window such as the multiplate safety glass laminate described herein. There are many well-known plasticizers suitable for use with polyvinyl butyral disclosed in U.S. Pat. No. 2,526,728 to Burk et al. The most commonly used are monocarboxylic aliphatic acid esters of ether glycols, such as triethylene glycol di-2 ethyl butyrate.

Generally, the plasticizers used are water-insoluble esters of a polybasic acid or a polyhydric alcohol. Particularly desirable plasticizers for use in the present invention are triethylene glycol di(2-ethyl-butyrate), dibutyl sebacate, di(beta-butoxy-ethyl) adipate, and dioctyl phthalate. Other suitable plasticizers include triethylene glycol fully esterified with a mixture of 80–90 percent caprylic acid and 10–20 percent capric acid as described in U.S. Pat. No. 2,372,522, dimethyl phthalate, dibutyl phthalate, di (butoxyethyl) sebacate, methyl palmitate, methoxyethyl palmitate, triethylene glycol dibutyrate, triethylene glycol diacetate, tricresyl phosphate, triethyl citrate, butyl butyryl lactate, ethyl para-toluene sulfonamide, dibutyl sulfone, lauryl alcohol, oleyl alcohol, glycerol triricinoleate, methyl lauroyl glycolate, butyl octanoyl glycolate and butyl laurate. The above list of plasticizers does not represent all the known plasticizers which can be used. Such a list would be impractical and would serve no purpose since one skilled in the art can readily select a plasticizer from the many already known. It has been found preferable to use less than 25 parts of triethylene glycol di(2-ethylbutyrate) plasticizer for every 100 parts by weight of polyvinyl butyral for the impact striking portion.

The thickness of the interlayer is a factor in promoting penetration resistance. Another factor that determines penetration resistance is the stress distribution throughout the thickness of the glass sheets comprising a laminated glass plastic assembly that comprises the impact striking section.

The low strength of glass is usually attributed to minute surface flaws and to brittleness, which does not permit the glass to flow to relieve very high local stresses in the vicinity of these flaws. Since the stress concentrating effect of the flaws comes into play in tension only, glass is weak in tension only. Its compressive strength is high and in the absence of gross manufacturing defects, fractures invariably originate from a surface in tension.

Tempering strengthens glass by compressively prestressing its surfaces. This compression of the surface layers is balanced by tension in the interior. While the tensile stresses thus created in the interior have no effect on the strength of the glass, their presence may have a far-reaching influence on the course of breakage once fracture has been initiated.

At present there are two types of glass strengthening processes used. They are thermal and chemical tempering.

In thermal tempering, the desired compressive stresses in the surface are obtained by rapidly chilling initially hot glass, so that its surfaces solidify and contract while its core is still relatively fluid. By the time the core has also set, its contraction is resisted by the already solid surface layers, which are thus put into compression while the core itself is put in tension. The stress distribution across the thickness of thermally tempered glass is characteristically parabolic. Typically, the regions of glass near the surfaces, to a depth of about 2/10 of the total thickness, are in compression with a maximum value of the compressive stress at the surface of approximately 20,000 pounds per square inch. To balance this surface compression, the interior 6/10 of the glass thickness is in tension, the maximum tension at the center of the glass thickness having a value of about one half the maximum surface compression.

While untempered glass usually breaks into a few large, sharp-edged pieces, thermally tempered glass, when it does break, disintegrates into many small fragments, typically, cubes having dimensions equal to the thickness of the glass and relatively blunt edges and corners. Both the size and shape of these fragments make them much less dangerous than fragments of untempered glass. The average particle size of tempered glass is probably related to the specific strain energy of the glass, i.e., the elastic energy stored in a unit volume of the prestressed material. This, in turn, depends primarily on the maximum stresses in the glass, since the parabolic shape of the stress distribution in thermally tempered glass is substantially independent of the level of stress.

Strengthening by chemical means, also called chemical tempering, though somewhat newer than the art of thermal tempering, is also well known. There are several mechanisms by which it may be accomplished. One of these entails ion exchange in the surface layers of the glass at a temperature approaching the strain point of the glass. In the ion exchange process, relatively small ions, such as sodium, are replaced by larger ions, such as potassium, or even smaller ions, such as lithium, are replaced by larger ions, such as sodium and/or potassium. The crowding of the larger ions into the spaces left by removal of the smaller ions produces a compression of the surface layers. Two other mechanisms for chemical tempering entail either ion exchange or partial crystallization, or both, at elevated temperatures, in such a manner that the modified surface layers of glass have a lower coefficient of expansion than the base glass. When an article thus treated is cooled to room temperature, the differential contraction of the surface and interior layers again produces compressive stresses in the surface.

Since diffusion is a relatively slow process, the effects of chemical tempering do not penetrate very deeply into the glass. This is reflected in the stress distribution in chemically tempered glass. In such glass, the compressive stress ranges from a relatively high level at the surfaces to zero at a depth of only a few thousandth of an inch below the surface. The rest of the interior of the glass sustains only a very low tensile stress, required to balance the compressive forces in the very thin layers near the surfaces. Thus, it may be seen that chemically tempered glass having the same surface compressive stress as thermally tempered glass may have much less interior tension stress and very much lower specific strain energy. Thus, while its strength in the absence of gross surface abrasions may be the same as that of thermally tempered glass, it does not have the same propensity to disintegrate when broken. This may be an advantage in some applications, as will be considered below. It is usually considered a disadvantage in vehicle applications where the small size of fragments is as important as the enhancement of strength. To make for such fine fragmentation, one can raise the surface compressive strength or increase the thickness of the compressed layers, or do both, in order to raise the specific strain energy of the glass to the level at which the particle size of its fragments may be comparable with that of glass thermally tempered to give a surface compression of about 20,000 pounds per square inch. Indeed, the usual chemically tempered glass intended for automotive applications is made to have surface compressive stresses on the order of 80,000 pounds per square inch.

Comparing thermally and chemically tempered glass, the former has the advantage that the greater thickness of the compressive layers on its surface gives it more abrasion resistance. Chemically tempered glass has the advantage of more readily permitting the attainment of much higher temper stresses, and, therefore, higher strengths. In addition, it has the advantage that the thickness of the compressive layer, and with it the specific strain energy of the material, may be varied at will, permitting the fracture pattern of chemically tempered glass to be controlled independently of its strength.

It is also well known to chemically temper glass that has been previously thermally tempered. This combination of tempering steps places a higher compression stress in the surface of the glass to a lesser depth than the depth of the compression zone produced by thermal tempering, thereby resulting in a stronger glass article than one produced by thermal tempering alone.

According to a typical operation, increased impact resistance, breaking stress and penetration resistance are secured in glass by chemical tempering. In a typical example with an alkali silica glass, for example, soda-lime-silica glass, a glass sheet is contacted with a potassium salt at a selected temperature range, preefrably above 875 degrees Fahrenheit and below the strain point of the glass, for sufficient time for an exchange to take place in the surface zone of the glass. Preferably, the glass sheet is immersed in a molten bath of a potassium salt, preferably potassium nitrate. During immersion, an exchange takes place wherein potassium from the potassium bath is introduced into the glass surface, apparently in exchange for sodium present in the exterior or surface zone of the glass sheet. It is believed that chemical tempering of soda-lime-silica glass is an ion exchange phenomenon wherein potassium ions are exchanged for sodium ions.

Other glass compositions may be chemically tempered by immersion in alkali metal salt baths. For example, an alkali silica glass containing lithium may be advantageously chemically tempered by immersion in a molten bath of a sodium salt or a potassium salt or a mixture thereof at an elevated temperature approaching the strain point of the glass. It is also possible to provide a multiple step chemical tempering operation in which a lithium containing glass has its lithium ions exchanged for sodium ions, which, subsequently, are exchanged for potassium ions in a second immersion wherein the sodium enriched surface zone produced by the first ion exchange operation becomes a potassium enriched surface zone during the second immersion.

After treating the glass composition as recited in the chemical tempering operations described above, the chemical nature of the alkali metal oxide constituents of the surface zone of the glass article is altered radically with replacement of lithium by sodium and/or potassium or sodium by potassium, depending upon the initial glass composition. At the same time the central interior regions of the glass article contain substantially the same concentration of alkali metal as before the treatment.

At lower temperatures the effect of such contact with a molten metal salt is much slower with the result that chemically tempered glass articles are difficult to achieve within the periods of time which are commercially practicable. For example, an immersion of soda-lime-silica glass for one hour in molten potassium nitrate at 700 degrees Fahrenheit does not improve the strength properties of the glass substantially. Much longer periods of immersion at this temperature are required to produce strength comparable to that achieved in the minimal time periods (5 to 10 minutes) at higher temperatures. At temperatures exceeding 870 degrees Fahrenheit, the desired strength improvement occurs even more rapidly.

The upper limit of the contact temperature depends upon the softening temperature and melting temperature of the glass article under treatment. The contact temperature cannot exceed the melting temperature of the glass composition but it can exceed the strain point and even the softening point of the glass composition under certain circumstances. For example, as long as the glass can be supported properly, the contact temperature can be maintained even at a temperature above the softening temperature of the glass provided the contact at these elevated temperatures is of sufficiently short duration to avoid thermal relaxation of the ion exchange induced strength characteristics. In fact, in some cases it is possible to maintain the contact temperature within the softening temperature range of the particular glass article undergoing treatment. Under these thermal conditions, extremely short contact times can be employed such as on the order of one minute or less.

The depth or thickness of the surface zone of compression depends upon the temperature and the duration of the chemical tempering treatment. In transparent safety glass armor, tempered glass is often preferred to untempered glass and, chemically tempered glass is preferred over thermally tempered glass, although the present invention is useful regardless of the temper or lack thereof in the glass-plastic assembly comprising a part of the present invention.

Multiplate safety glass laminates offer two primary safety advantages over non-laminated glass. In the event of impact by a projectile, the bonding between the glass and the interlayers holds the glass articles in the same relative position, thereby preventing the possibility of injury as a result of flying glass. Holding the particles in the same relative position also limits the possibility of having sharp edges of broken glass exposed. Another advantage of the multiplate safety glass laminate is due to the physical properties of the interlayer materials. Unlike glass and other rigid materials, an elastomer stretches prior to rupture rather than breaking immediately when subjected to impact. On impact, an elastomer elongates, thereby absorbing energy from the impacting object and reducing the velocity of the impacting object. In many instances, the velocity of the impacting object is reduced to zero before the object or projectile penetrates the elastomer.

When an elastomer such as polyvinyl butyral or a polyurethane is employed as an interlayer between adjacent glass sheets or between a glass sheet and a polycarbonate inner sheet, such a laminate retains some of the elastomeric properties of the elastomer. Thus, when impacted, a windshield consisting of alternate sheets of glass and interlayers will elongate in the immediate area of impact by the projectile, thereby absorbing energy from the object and reducing its velocity. This property of a multiplate safety glass laminate will be referred to as penetration resistance.

The impact absorption section of glass-plastic composites is preferably made with a polyurethane interlayer. A suitable polyurethane for this purpose is a reaction product of a poly(oxypolymethylene) glycol, an organic polyisocyanate and a curing agent containing at least two active hydrogens per molecule. The curing agent can be a polyol or a polyamine and may be used with an excess of polyisocyanate. Preferably, a prepolymer of poly(oxytetramethylene) glycol is made and then cured. The curing can be carried out while the reaction mixture is in contact with the innermost glass sheet of the impact striking section and the outward facing surface of the impact absorption section.

In order for this resinous interlayer to be effective for the impact transition section, it must have a number of properties, including: (1) it must itself have a high impact energy absorption level so that it may withstand high impact from moving objects; high tensile strength and high percentage of elongation are measures of this property; (2) it must have good shear and tear strength to prevent rupture from the broken glass itself; (3) it must have good adhesion to the glass itself and also to polycarbonates and other materials used in the impact absorption section, so as to prevent any opaqueness or workability.

A certain specific type polyurethane composition employed successfully as cast and cured-in-place impact transition section that meets the rigid requirements necessary for commercially acceptable multiplate safety glass is described and claimed in U.S. Pat. No. 3,509,015 to Marco Wismer, Vernon G. Ammons and Michael E. Dufala.

The particular type of polyurethane which is employed as a composition for the impact transition section is made from a poly(oxypolymethylene) glycol, wherein the said glycol contains oxypolymethylene groups in which a linear chain of from about 3 to about 6 carbon atoms separate each adjacent pair of oxygen atoms.

Representative poly(oxypolymethylene) glycols include those of the formula

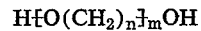

$$H\{O(CH_2)_n\}_mOH$$

where $n$ is from 3 to 6 and $m$ can be varied considerably, e.g., from 2 to 30 or higher, preferably being between about 6 and about 20. Included are poly(oxytetramethylene) glycols, which are preferred, and poly(oxytrimethylene) glycols, which are also advantageously utilized, as well as poly(oxypentamethylene) glycols, and poly(oxyhexamethylene) glycols. Other poly(oxypolymethylene) glycols not within the above formula are also usable but are less desirable as a class; these include, for example, branched carbon chain compounds.

It is desirable that the poly(oxypolymethylene) glycol have a molecular weight between about 400 and about 3500. The preferred molecular weight range varies somewhat with the curing agent employed. For example, when a polyol is used to cure the system (along with excess polyisocyanate), the poly(oxypolymethylene) glycol preferably has a molecular weight between about 500 and about 2000, and when a curing system is utilized, the preferred range is from about 500 to about 1800. With polyamine curing systems, the molecular weight is usually between about 500 and about 3000. Other materials, outside these ranges, can be employed and interlayers made therefrom have good optical transparency and have good adhesion to glass. However, safety glass made therefrom is less satisfactory because it tends to have poorer impact energy absorption level at either low or high temperatures. For instance, if the poly(oxypolymethylene) glycol has a molecular weight below the above ranges, the resinous compositions may become too brittle at low temperatures, and if the poly(oxypolymethylene) glycol has a higher molecular weight above these mentioned, the interlayer tends to lack rigidity at high temperatures, so that lowered impact resistance is attained.

The resinous compositions of the instant invention are prepared from the interaction of an organic polyisocyanate and a poly(oxypolymethylene) glycol, as defined above, and a curing agent containing at least about 2 active hydrogen atoms per molecule (the term "active hydrogen" herein refers to active hydrogen atoms as determined by the Zerewitinoff method, i.e., which are reactive with Zerewitinoff reagent).

Among the organic polyisocyanates that can be employed are the various organic compounds containing two or more isocyanate groups, or mixtures of such compounds, including aromatic, aliphatic and cycloaliphatic diisocyanates and triisocyanates, and combinations of these types. Representative compounds include 2,4-toluene diisocyanate, m-phenylene diisocyanate, 4 - chloro-1,3-phenylene diisocyanate, 4,4' - diphenylene diisocyanate, 3,3'-dimethyl-4,4'-diphenylene diisocyanate, 1,5-naphthylene diisocyanate, 1,4 - tetramethylene diisocyanate, 1,6-hexamethylene diisocyanate, 1,10 - decamethylene diisocyanate, 1,4-cyclohexylene diisocyanate, 4,4'-methylene-bis-(cyclohexyl isocyanate), 1,5-tetrahydronaphthlene diisocyanate, p-xylylene diisocyanate, durene diisocyanate, and 1,2,4-benzene triisocyanate. Arylene diisocyanates, i.e., those in which each of the two isocyanate groups is attached directly to an aromatic ring are preferred. The sterically hindered types such as 3,5-diethylmethylene-bis-(4-phenylene isocyanate) and o,o'-diethyl-para-benzene diisocyanate, in which the two isocyanate groups differ greatly in reactivity, are also of interest. The diisocyanates may contain other substitutents which do not react with isocyanate groups. In the case of the aromatic compounds, the isocyanate groups may be attached either to the same or to different rings. Dimers of monomeric diisocyanates, and di(isocyanatoaryl) ureas such as di-(3-isocyanato-4-methyl-phenyl) urea may be used.

Ordinarily, the amount of polyisocyanate utilized is sufficient to react one mole of polyisocyanate per hydroxyl equivalent of the poly(oxypolymethylene) glycol. However, this ratio is not critical except for obtention of optimum results, and higher or lower amounts can be employed. Higher amounts are preferred in certain cases, as is more fully described below, while lower amounts merely result in less than complete utilization of the glycol in the polyurethane products and may result in a plasticizing effect on the interlayer.

It is preferred to utilize the polyisocyanate and the poly(oxypolymethylene) glycol in the form of a so-called "prepolymer," in which the polyisocyanate is partially reacted with the glycol to form an isocyanate-terminated adduct, which is then cured. Prepolymers made from toluene diisocyanate and poly(oxytetramethylene) glycols are available commercially and have been extensively utilized in the practice of the invention.

The curing agent employed can be any organic compound containing at least two active hydrogens per molecule; preferably the active hydrogen is in hydroxyl groups, at least in part. Satisfactory products for many applications are produced from any such curing agent as long as the glycol used contains oxypolymethylene groups as described. However, for the obtention of interlayers of the best overall properties, certain curing systems are preferred. These include:

(1) Polyols, and especially those having at least three hydroxyl groups. It is desirable to employ these along with an excess of polyisocyanate over the usual one mole per hydroxyl equivalent of the poly(oxypolymethylene) glycol.

(2) Polyols having at least 3 hydroxyl groups in conjunction with a diol.

(3) Polyamines, preferably also utilized with a polyol.

The polyol which is utilized as the curing agent in the presence of excess polyisocyanate can be a diol, such as ethylene glycol, 1,4-butanediol or 1,6-hexanediol, but preferred are polyols which have three or more labile hydrogen atoms per molecule and which are compatible with the reaction system, i.e., soluble in the reaction mass. Theoretically, there is no real limit as to the number of hydroxyl groups per molecule of the polyol. As a practical matter, however, the size of the molecule would ultimately affect the properties such as solubility, etc., and therefore make its use undesirable.

Polyols having up to 8 and even 10 hydroxyl groups per molecule have been shown to be operative. Examples of polyols which can be employed include trimethylolpropane, trimethylolheptane, trimethylolethane, pentaerythritol, sorbitol, castor oil, the reaction products of allyl alcohol with styrene, polyether polyols, polyester polyols, nitrogen-containing polyols (e.g., reaction products of alkylene oxides with urea or similar compounds), and others.

When a polyol is used as the sole curing agent, it is desirable to include in the reaction mass excess polyisocyanate over the amount required to react with the glycol to form an isocyanato-terminated prepolymer, that is, in excess of one mole of polyisocyanate per hydroxyl equivalent of glycol. Thus, it is preferred to use a total of more than 2 moles of polyisocyanate per mole of glycol. Preferably, a total of about 4 moles of polyisocyanate per mole of glycol is present, although twice this much or even more can be used. Generally, however, lowered pot life and other processing difficulties, as well as less than optimum properties, are encountered when too large an excess of polyisocyanate is present.

The impact transition section may also be advantageously made by curing the propolymer or glycolpolyisocyanate blend with a curing system comprising both a polyol having three or more hydroxyl groups and a diol. In such products the various polyols having 3 or more hydroxyls, such as those mentioned above, are employed along with any of a wide variety of diols, for example, the lower molecular weight glycols, such as ethylene, propylene, butylene, pentylene, and higher or substituted alkylene diols, and the various hydroxyl-substituted aryl compounds. Particularly useful are 1,4 - butanediol, 2,2-bis(4 - hydroxycyclohexyl) propane, 1,5-pentanediol, and 2-methyl-2-n-propyl-1,3-propanediol.

In these curing systems the polyol functions as a crosslinking agent and the diol as a chain extender. In order to obtain optimum results, the curing system is used in amounts so that the total of the labile hydrogen atoms is approximately stoichiometrically equal to the free isocyanate groups of the prepolymer. Generally, this means that the amount is within 5 percent above the stoichiometric point, and preferably is within 3 percent of stoichiometry.

In order to obtain the optimum results with the various molecular weight poly(oxypolymethylene) glycols certain diol-polyol ratios should be employed, for example, there are preferably employed about 3.5 equivalents of diol for each equivalent of polyol with the higher molecular weights (1250 to 1800), about 6 equivalents of diol for each equivalent of polyol with the intermediate molecular weights (650 to 850), and about 9 equivalents of diol per equivalent of polyol with the lower molecular weights (about 500 to about 650). However, generally satisfactory resinous interlayer compositions can be made with ratios of diol to polyol ranging from 1.5:1 to 10:1.

It has also been found that the physical properties of the product can be changed to a certain extent by employing either a diol which imparts plasticizing properties to the final polymer, straight chain poly(butylene oxide) glycol being an example of the former and 2,2-bis(4-hydroxycyclohexyl) propane being an example of the latter. These can permit use of higher or lower molecular weight glycols than those mentioned.

Another type of curing system usable herein comprises a polyamine, preferably in conjunction with a polyol. While it is possible to use a polyamine alone as the curing agent for prepolymers made from poly(oxypolymethylene) glycols, these usually give feasible pot lives only with the higher molecular weight range glycols (e.g., 2000–3000). By adding different amounts of various polyols, it is possible to adjust the curing time of the resinous composition to prolong the pot life and also to employ lower molecular weight glycols with good results.

Polyamines having 2,3,4,5,6 or more reactive amine groups are operative. Particularly desirable are aromatic diamines, such as 4,4' - methylene-bis(2 - chloroaniline), diamino diphenyl sulfone, 4,4 - diaminobenzophenone and diallyl melamine. Other polyamines which may be used include the aminotriazines such as melamine and the alkyl substituted melamines, benzoguanamine, the aliphatic polyamines and other aromatic diamines such as orth-, meta-, and para-phenylene diamine, and p,p'-methylene dianiline.

Any one of a wide variety of polyols can be utilized along with the polyamine. For example, the lower molecular weight glycols, such as ethylene, propylene, butylene, pentylene, and the higher alkylene diols can be used, as can lower molecular weight poly(alkylene oxide) glycols, such as polypropylene oxide glycol having a molecular weight between 250 and 400, and various hydroxyl-substituted aryl compounds. Particularly useful are 1,4-butanediol, 1,5 - pentanediol, 2,2 - bis(4 - hydroxycyclohexyl) propane, reaction products of polyols with alkylene oxides, trimethylolpropane, trimethylolethane, pentaerythritol, castor oil, reaction products of allyl alcohol and styrene, and trimethylolheptane.

It is usually desirable that the labile hydrogen atoms of the polyamine-polyol curing system be stoichiometrically balanced with the isocyanate radicals of the prepolymer. However, fairly good properties are obtained when less than the theoretical amount of the labile hydrogen atoms are present, in which case many of the thus formed urea hydrogen atoms probably react with the remaining isocyanate radicals to produce cross-linking, wherein some of the nitrogens of the polyurea are tertiary and form a biuret-type linkage.

The resinous impact transition section is ordinarily prepared by first heating a "prepolymer" of the glycol and polyisocyanate (or these components themselves) under a vacuum for about 1 to 2 hours. The prepolymer is then mixed with the curing agent in a suitable vessel. The mixture is then further heated under a vacuum in order to remove any gases which are present or which were entrained during the mixing. Removal of the trapped and entrained gases throughout the production of the multiplate safety glass is desirable in order to avoid bubbles and the like.

The polycarbonate sheet for the impact absorption section may be any suitable sheet of polycarbonate, such as that disclosed in U.S. Pats. 3,028,365 and 3,117,019, and is preferably prepared by reacting di(monohydroxyaryl) alkanes with derivatives of the carbonic acid such as phosgene and bischloro-carbonic acid esters of di(monohydroxyaryl) alkanes.

The aryl residues of the di(monohydroxyaryl) alkanes can be alike or different. The aryl residues can also carry substituents which are not capable of reacting in the conversion into polycarbonates, such as halogen atoms or alkyl groups, for example, the methyl, ethyl, propyl, or tert. butyl group. The alkyl residue of the di(monohydroxyaryl) alkanes linking the two benzene rings can be an open chain or a cycloaliphatic ring and may be substituted, if desired, for example, by an aryl residue.

Suitable di(monohydroxyaryl) alkanes are, for example, (4,4'-dihydroxy-diphenyl) methane, 2,2-(4,4'-dihydroxy-diphenyl) propane, 1,1-(4,4'-dihydroxy-diphenyl) cyclohexane, 1,1-(4,4'-dihydroxy-3,3'-dimethyl-diphenyl) cyclohexane, 1,1 - (2,2'-dihydroxy-4,4'-dimethyl-diphenyl) butane, (boiling point: 185–188° C. under 0.5 mm. mercury gauge), 2,2-(2,2' - dihydroxy-4,4'-di-tert-butyl-diphenyl) propane or 1,1'-(4,4'-dihydroxy-diphenyl)-1-phenyl ethane; furthermore, methane derivatives which carry besides two hydroxyaryl groups an alkyl residue with at least two carbon atoms and a second alkyl residue with one or more carbon atoms such as 2,2-(4,4'-dihydroxy-diphenyl) butane, 2,2 - (4,4' - dihydroxy-diphenyl) pentane (melting point 149–150° C.), 3,3-(4,4'-dihydroxy-diphenyl) pentane, 2,2-(4,4'-dihydroxy-diphenyl) hexane, 3,3-(4,4'-dihydroxy-diphenyl) hexane, 2,2-(4,4'-dihydroxy-diphenyl)-4-methyl pentane (melting point 151–152° C.), 2,2-(4,4'-dihydroxy-diphenyl) heptane (boiling point 198–200° C. under 0.33 mm. mercury gauge), 4,4-(4,4'-dihydroxy-diphenyl) heptane (melting point 148–149° C.), or 2,2-(4,4'-dihydroxy-diphenyl) tridecane. Suitable di(monohydroxyaryl) alkanes the two aryl residues of which are different are, for example, 2,2-(4,4'-dihydroxy-3'-methyl-diphenyl) propane and 2,2-(4,4'-dihydroxy-3-methyl-3'-isopropyl-diphenyl) butane. Suitable di(monohydroxyaryl) alkanes the aryl residues of which carry halogen atoms are, for instance, 2,2-(3,5,3',5'-tetrachloro-4,4'-dihydroxy-diphenyl) propane, 2,2 - (3,5,3',5'-tetrabromo-4,4'-dihydroxy-diphenyl) propane, (3,3'-dichloro-4,4'-dihydroxy-diphenyl) methane and 2,2'-dihydroxy-5,5'-difluoro-diphenyl methane. Suitable di(monohydroxyaryl) alkanes the alky residue of which linking the two benzene rings is substituted by an aryl residue are, for instance, (4,4'-dihydroxy-diphenyl) phenyl methane and 1,1-(4,4'-dihydroxy-diphenyl)-1-phenyl ethane.

In order to obtain special properties, mixtures of various di(monohydroxyaryl) alkanes can also be used, thus mixed polycarbonates are obtained.

The conversion of the aforesaid di(monohydroxyaryl) alkanes into high molecular polycarbonates by reacting with the mentioned derivates of the carbonic acid may be carried out as known in the art. For instance, the di(monohydroxyaryl) alkanes can be re-esterified with carbonic acid diesters, e.g., dimethyl-, diethyl-, dipropyl-, dibutyl-, diamyl-, dioctyl-, dicyclohexyl-, diphenyl- and di-o, p-tolyl carbonate at elevated temperatures from about 50 to about 320° C. and especially from about 120 to about 280° C.

The polycarbonates can also be produced by introducing phosgene into solutions of di(monohydroxyaryl) alkanes in organic bases, such as dimethylaniline, diethylaniline, trimethylamine and pyridine, or into solutions of di(monohydroxyaryl) alkanes in inert organic solvents, such as benzine, ligroine, cyclohexane, methylcyclohexane, benzene, toluene, xylene, chloroform, methylene chloride, carbon tetrachloride, trichloroethylene, dichloroethane, methylacetate, and ethylacetate, with the addition of an acid-binding agent as mentioned above.

A process particularly suitable for producing polycarbonates consists in introducing phosgene into the aqueous solution or suspension of alkali metal salts such as lithium-, sodium-, potassium- and calcium salts of the di (monohydroxyaryl) alkanes, preferably in the presence of an excess of a base such as lithium-, sodium-, potassium- and calcium hydroxide- or carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

The phosgene may be used in an equivalent amount. Generally, however, it is preferable to use an excess of phosgene.

Finally, it is also possible to react the di(monohydroxyaryl) alkanes with about equimolecular amounts of bis-chloro carbonic acid esters of di(monohydroxyaryl) alkanes under corresponding conditions.

In the production of polycarbonates according to the various processes, it is advantageous to employ small amounts of reducing agents, for example, sodium-, or potassium-sulphide, -sulphite and dithionite or free phenol and p-tert.-butylphenol.

By adding monofunctional compounds which are capable of reacting with phosgene or with the end groups of the polycarbonates consisting of the chlorocarbonic acid ester group and which terminate the chains, such as the phenols, for instance, the phenol, the tert.-butyl-phenol, the cyclohexylphenol, and 2,2 - (4 - hydroxyphenol-4'- methoxyphenyl) propane, further aniline and methylaniline, it is possible to regulate the molecular weight of the polycarbonates in wide limits.

The reaction of the di(monohydroxyaryl) alkanes with phosgene or of the chlorocarbonic esters of the di(monohydroxyaryl) alkanes may be carried out at room temperature or at lower or elevated temperatures, that is to say at tempertures from the freezing point to the boiling point of the mixture. (Column 1, line 21, to Column 3, line 1 of 3,028,365.) The polycarbonate sheet preferably has a thickness of from about 60 to about 375 mils and most preferably from about 100 to about 250 mils. In some cases, it may be desirable to use copolymers of various dihydroxy aryl propanes in order to achieve special properties.

Other pellucid materials are disclosed in U.S. Pat. 3,069,301 at Column 1, lines 62–68, which are rigid and resistant to scratching and essentially non-hydroscopic.

In the prior art, the impact striking portion of transparent safety glass armor assembly, which portion comprised alternating plies of glass and plastic, was laminated under heat and pressure. The laminated assembly that resulted was formed into a wall of a casting cell with a polycarbonate inner sheet serving as the other wall of the casting cell, which was completed by a peripheral spacing member. A cast-in-place interlayer, preferably polyurethane, was cast into the casting cell formed between the laminated assembly and the polycarbonate sheet and cured under heat. The resulting assembly comprised the glass-plastic laminate (which served as the impact striking portion), the cast-in-place interlayer (which served as the impact transition portion), and the polycarbonate sheet, (which served as the impact absorption section).

This resulting assembly was covered with a caulking material along its side surfaces and the marginal portion of the exposed polycarbonate sheet and inserted in a case of metal, or glass-reinforced plastic. The casing was open ended and made of opaque material such as metal or plastic-reinforced fiber glass. The casing encased the sidewalls of the glass-plastic assembly and had a peripheral flange that extended inward from the sidewalls of the casing to overlap the margin of the polycarbonate sheet. After the caulked assembly was secured to the metal case in the manner described above, excess caulking material was trimmed by scraping, dissolving, washing, and other similar treatments.

This technique required many assembly steps and was expensive and time consuming. Furthermore, typical caulking materials used previously were polysulfides and silicone rubbers. They were difficult to apply because they are thixotropic and had to be applied about the outer surface of the laminated glass-plastic assembly, thus making it difficult to handle the assembly covered with the caulking material.

THE PRESENT INVENTION

According to the present invention, the caulking and trimming steps are eliminated by casting the polymerizable polyurethane in the space between the casing and the impact striking portion at the same time as the polyurethane is cast in the space between the polycarbonate impact absorption section and the rear surface of the impact striking section.

According to a further refinement of this invention, the transparent polycarbonate sheet is constructed in the form of a casing closed at the inner end of the multiplate glass-plastic assembly and the plasticizable polyurethane is cast between the casing and the assembly at the same time as the impact transition section is cast between the impact striking section and the closed end of the polycarbonate casing. This results in an integral unit with the casing that has better resistance to penetration by impacting projectiles than the prior art articles and also provides a more efficient and less costly manner of producing such an integral unit.

DESCRIPTION OF SPECIFIC ILLUSTRATIVE EMBODIMENTS

Figure 2:
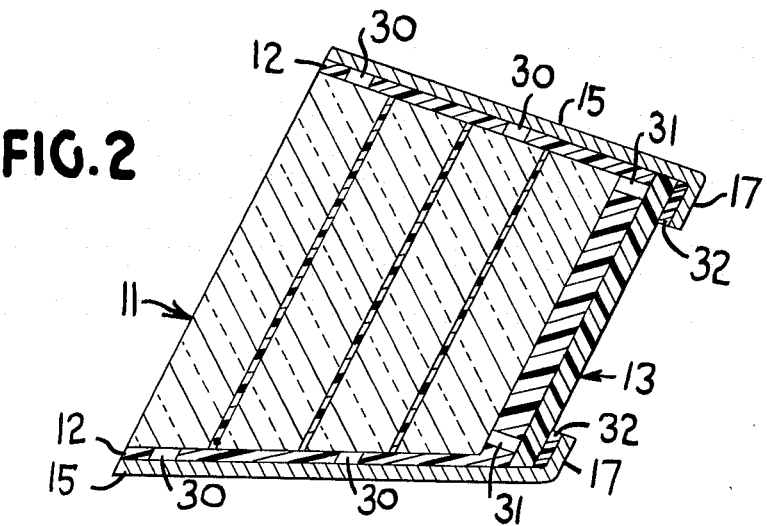
Figure 3:
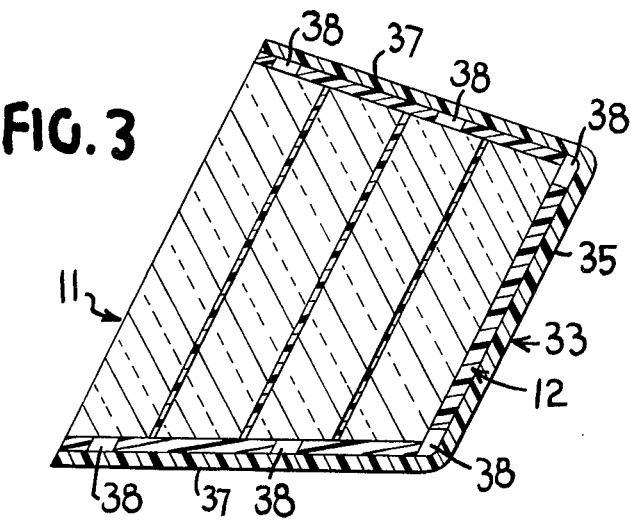
Figure 4:
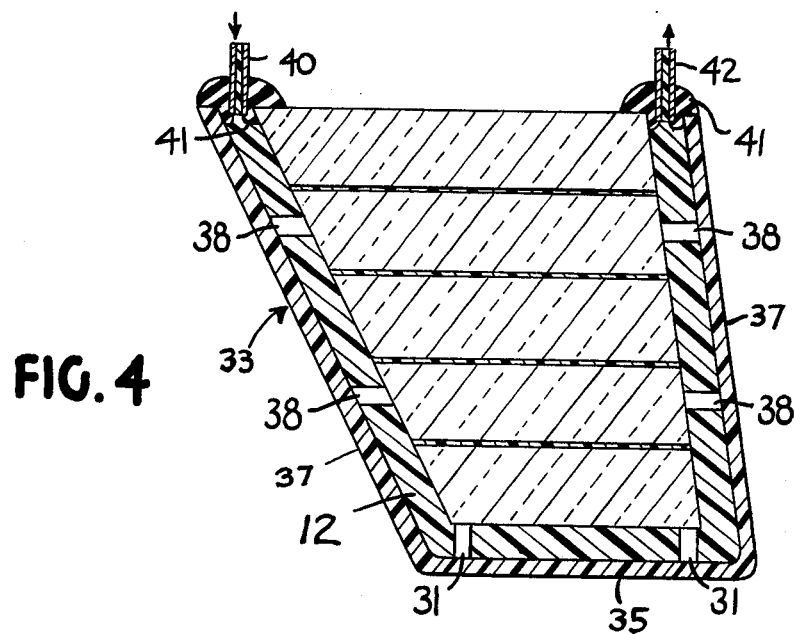
Figure 5:
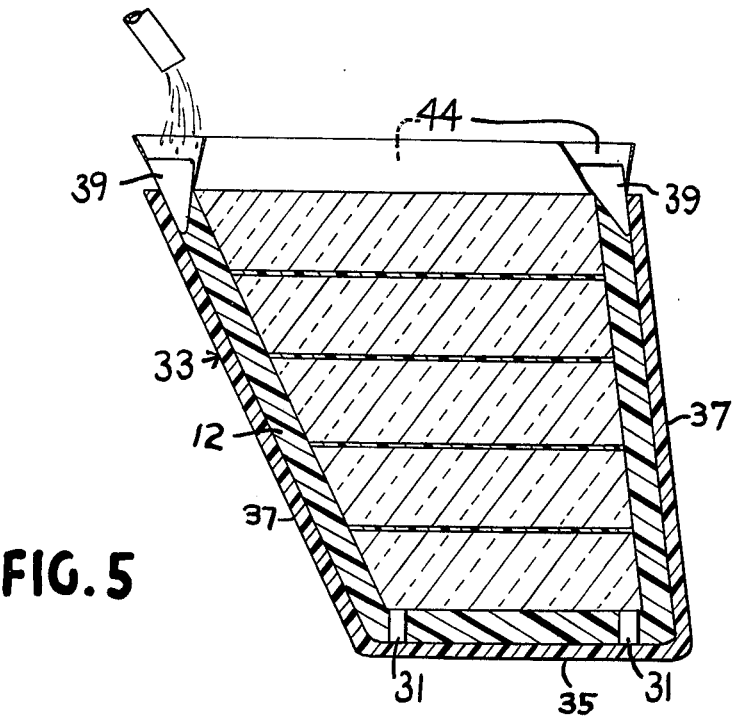

The present invention will be better understood in the light of specific examples of illustrative embodiments which follow. In the drawings that form part of a description of illustrative embodiments of the invention wherein like reference numbers refer to like structural elements, FIG. 1 is a cross sectional view of a transparent safety glass armor unit according to the prior art;

FIGS. 2 and 3 are similar views of two illustrative embodiments of the present invention, and FIGS. 4 and 5 are schematic views showing how various embodiments conforming to the present invention are assembled.

A typical prior art assembly as shown in FIG. 1 shows an impact striking section 11 and an impact transition section 12 and impact absorption section 13, all of transparent material arranged within a casing 15 of opaque material such as metal or reinforced fiber glass. Caulking 16 secures the tapering walls of the assembly to the inner walls of the casing 15.

The impact striking section 11 comprises an outermost sheet of glass 21, a layer of plasticized polyvinyl butyral 22, a second sheet of glass 23, a second layer of polyvinyl butyral 24, a third sheet of glass 25, a third sheet of polyvinyl butyral 26 and a fourth sheet of glass 27. While the illustrated impact striking section comprises four glass sheets and three interlayers, it is understood that the number of layers may be varied depending on the weight that can be accepted consistent with penetration resistance desired. The cross-sectional area of the impact striking section 11 gradually decreases from a maximum at the outer surface 28 of the outermost glass sheet 21 to the inner surface of the innermost glass sheet 27.

The impact transition section 12 is composed of polymerized cast-in-place polyurethane, and the impact absorption section 13 is a sheet of polycarbonate. The casing 15 has a peripheral flange 17 extending over the inner surface of the polycarbonate sheet which serves as the impact absorption section 13. This structure is difficult to assemble and fabricate. Furthermore, there is a possibility that an impacting projectile will cause the polycarbonate sheet 13 to be dislodged from its position within the peripheral flange 17 of the casing 15.

In one embodiment of the present invention depicted in FIG. 2, the necessity for the caulking material 16 is eliminated by inserting a previously laminated impact striking section 11 into a casing 15 provided with spacer elements 30 in the form of small pegs of cork or silicone bead material, for example, taped to the inner wall of the casing 15 to space the section 11 from the inner wall of the casing 15. Added spacer elements 31, such as polyurethane pieces, are adhered to either facing surface of the innermost glass sheet 27 or that of the polycarbonate sheet to separate the impact striking section 11 from the polycarbonate sheet comprising the impact absorption section 13. A continuous gasket of material such as polyurethane tape or any adhesive sealing tape 32 is between the margin of the polycarbonate sheet and the flange 17 of the casing 15. The gasket has two adhesive surfaces. In the embodiment of FIG. 2, the polyurethane resin of the impact transition section 12 is cast in place and polymerizes to fill the space between the casing 15 and the impact striking section 11 in addition to serving the same purpose that it served in the prior art of filling the space between the impact striking section 11 and the impact absorption section 13 to serve as an impact transition section 12.

In FIG. 3, a polycarbonate casing 33 is provided. The casing has a bottom portion 35 of requisite optical transparency, and outwardly and obliquely extending walls 37. The bottom portion 35 occupies the position previously occupied by the polycarbonate sheet forming the impact absorption portion 13 in the prior art and the obliquely extending walls 37 replace the walls of the previously used metal or fiber glass reinforced casing 15. In this embodiment, spacing elements 38 may be molded integral to the inner surface of the polycarbonate casing and added wedge shaped spacers 39 as depicted in FIG. 5 may be inserted between the walls 37 and the side surfaces of the impact striking section 11, so as to provide spacing into which a cast-in-place polyurethane resin may be inserted. The inner surface of the side walls 37 may be abraded as by sandblasting to facilitate adhesion of the cured polyurethane, and reduce reflection of light by the side walls 37.

A typical casting operation is depicted in FIG. 4. The unit is assembled within the casing 33 with spacers 31 and 38 provided to space the impact striking section 11 (previously laminated) from the bottom portion 35 and the side walls 37 of the polyurethane casing 33. The polyurethane resin is inserted in a tube 40, preferably of aluminum, that is aligned with an inlet aperture of a silicone bead 41. The polyurethane is cast under a pressure head into the space defined by the spacer elements 31 and 38 between the polycarbonate casing 33 and the laminated impact striking section 11. An outlet port 42 is also provided for the silicone bead 41. The polyurethane material is prepared by heating the reaction product of a poly(oxypolymethylene) glycol and a polyisocyanate, then mixing it with a polyol curing agent immediately prior to casting. The cast material is cured in situ using a time-temperature relationship suitable for polyurethane polymerization as is described in detail in the example below. The inlet tube 40 and outlet port 42 are removed to trim any excess of cured polyurethane. As an alternative, the inlet and outlet ports may be provided by drilling suitable apertures in a portion of one or more side walls 37.

FIG. 5 shows an alternate embodiment for casting in which wedge shaped spacers 39 are used in conjunction with spacers 31 to support the impact striking portion 11 in spaced relation to the casing 33. The resin in liquid form is applied into the space between the portion 11 and the walls 37 of the casing through a peripheral passageway formed between two spaced sheets of flexible aluminum foil 44 that form an elongated funnel over the spacing. Such units were subjected to a 50 caliber armor piercing projectile under standard test conditions and withstood penetration at impact velocities which prior art devices such as depicted in FIG. 1 also passed.

EXAMPLE

A polycarbonate casing .115 inch thick, about 3 inches high and having a rectangular cross-section of 7 inches by 11 inches at its open end and 5 inches by 9 inches at its closed end is fitted with spacer elements about ⅛ inch to ¼ inch thick extending inward from the casing walls and added spacers 0.2 inch thick extending inward from its bottom wall.

As assembly comprising 5 glass sheets ½ inch thick alternating with 4 sheets of polyvinyl butyral .020 inch thick containing 21 parts by weight of triethylene glycol di(2-ethyl-butyrate) plasticizer per 100 parts of polyvinyl butyral are stacked in alternating relation, placed within a flexible bag of laminated polyethylene and polytetrafluoroethylene about 5 mils thick, the bag is evacuated and sealed and the bag and its contents immersed in an oil autoclave at 140° F. and a pressure of 200 p.s.i. The autoclave is heated to 200° F. in 25 minutes, held at 200° F. for 15 minutes and heated to 275° F. in 30 minutes, held at 275° F. for 60 minutes, cooled to 220° F. in 40 minutes, cooled to 180° F. in 30 minutes, cooled to 140° F. in 30 minutes, cooled to 100° F. in 30 minutes before releasing the pressure. The laminated assembly is removed from the laminating bag and sawed to a truncated pyramid shape of the requisite dimensions and placed within the casing. The cross-section of the assembly is such that it contacts the spaced elements and additional spacers within the casing.

A polyurethane casting composition is prepared by first mixing a prepolymer containing approximately 80 parts by weight of poly(oxytetramethylene) glycol having a molecular weight of 664 and 20 parts by weight of toluene diisocyanate obtained commercially as a mixture of 80 percent of the 2,4 isomer and 20 percent of the 2,6 isomer. The toluene diisocyanate has a molecular weight of about 1320 and a NCO content of 6.33 percent. The prepolymer is mixed with a curing agent, for example, one containing 13.78 parts of butanediol and 2.28 parts of trimethyl propane by weight per 100 parts of prepolymer.

The mixture is cast into the void between the laminated assembly and the casing and then cured for 22 hours at 175° F. Higher temperatures are suitable for shorter periods and longer periods are required for lower curing temperatures.

While a single example has been described, it is understood that variations in materials, times and temperatures and techniques of spacing may be used without departing from the spirit of the present invention. For example, the spacers for the inner end wall of the polycarbonate casing can be stamped from transparent sheets of plasticized polyurethane or polycarbonate and wedge shaped spacers may be inserted in the space between the assembly forming the impact striking portion 11 and the walls of the casing 15 or 33 instead of making the spacers integral with the casing. Other variations will be obvious as within the purview of the present invention as defined in the claimed subject matter that follows.

What is claimed is:
1. An integral multiplate safety glass unit comprising:
 (a) a casing having an open outer end and inward tapering walls,
 (b) a multiplate safety glass assembly containing a pellucid impact absorption section within said casing,
 (c) spacer elements defining a space between said assembly and said casing to align said assembly in spaced relation to the tapering walls of said casing,
 (d) said assembly comprising an impact transition section composed of a cast-in-place polyurethane, and
 (e) said cast-in-place polyurethane also occupying the space defined by said spacer elements between said assembly and said walls.

2. A unit as in claim 1 in which the pellucid impact absorption section is polycarbonate.

3. A unit as in claim 1, wherein said casing is of an opaque material and has a relatively wide open outer end at the outer end of said walls and a peripheral flange extending laterally inward from the inner end of said walls to define a relatively narrow open inner end.

4. A unit as in claim 3 which has a gasket between the margin of the impact absorption section and the peripheral flange.

5. A unit as in claim 1, wherein said casing is composed of a transparent polycarbonate that is closed on its inner end to provide a transparent layer which serves as said impact absorption section for said assembly.

6. A unit as in claim 5, wherein said plurality of spacing elements are attached to said polycarbonate casing and extend inward therefrom to define said space between said assembly and said casing.

7. A unit as in claim 5 wherein said casing is provided with an apertured side wall for receiving said cast-in-place polyurethane.

(References on following page)

References Cited

UNITED STATES PATENTS

| | | | |
|---|---|---|---|
| 2,436,374 | 2/1948 | Birdsall | 89—36 L X |
| 2,454,268 | 11/1948 | Brackett | 89—36 L X |
| 3,039,405 | 6/1962 | Barr | 109—58.5 |
| 3,388,034 | 6/1968 | McCombie | 161—199 X |
| 3,393,485 | 7/1968 | Wright | 89—36 A X |
| 3,505,160 | 4/1970 | Michaels et al. | 161—190 X |

JOHN T. GOOLKASIAN, Primary Examiner

J. C. GIL, Assistant Examiner

U.S. Cl. X.R.

89—36 L; 109—49.5; 156—99, 106; 161—183, 190, 199, 404; 264—275, 277